United States Patent [19]

Wills

[11] 4,183,326
[45] Jan. 15, 1980

[54] ANIMAL KICK RESTRAINER

[76] Inventor: Charlie R. Wills, Rte. 1, Box 144, Willows, Calif. 95988

[21] Appl. No.: 933,585

[22] Filed: Aug. 14, 1978

[51] Int. Cl.² .................... A01K 15/04; A01K 29/00
[52] U.S. Cl. ...................................... 119/96; 119/126
[58] Field of Search ................... 119/27, 96, 103, 126

[56] References Cited

U.S. PATENT DOCUMENTS

| 1,262,731 | 4/1918 | Young | 119/27 |
|---|---|---|---|
| 1,589,226 | 6/1926 | Regan et al. | 119/27 |
| 2,762,334 | 9/1956 | Allen | 119/126 |
| 2,853,052 | 9/1958 | Pearson | 119/27 |
| 3,033,161 | 5/1962 | Babson | 119/27 X |
| 3,572,294 | 3/1971 | Baker | 119/27 |
| 3,685,492 | 8/1972 | Baker | 119/27 |

Primary Examiner—Russell R. Kinsey
Assistant Examiner—Robert P. Swiatek
Attorney, Agent, or Firm—Blair, Brown & Kreten

[57] ABSTRACT

A kick restrainer for an animal such as a cow which is arranged to be attached to a pair of vertically spaced bars which may form part of an animal stall or the like including upper and lower brackets arranged to be retained in a clamped position on the bars with a vertically extending support rod having an animal restraining member slidably mounted in the brackets, the upper bracket having a spring connected to the rod for urging the rod upwardly into an extended position and the lower bracket provided with a manually operated jack device for releasably retaining the support rod in an adjustable vertical position and for manually moving the support rod downwardly against the urging force of the spring on the upper bracket to position the restraining member against the back of an animal.

10 Claims, 7 Drawing Figures

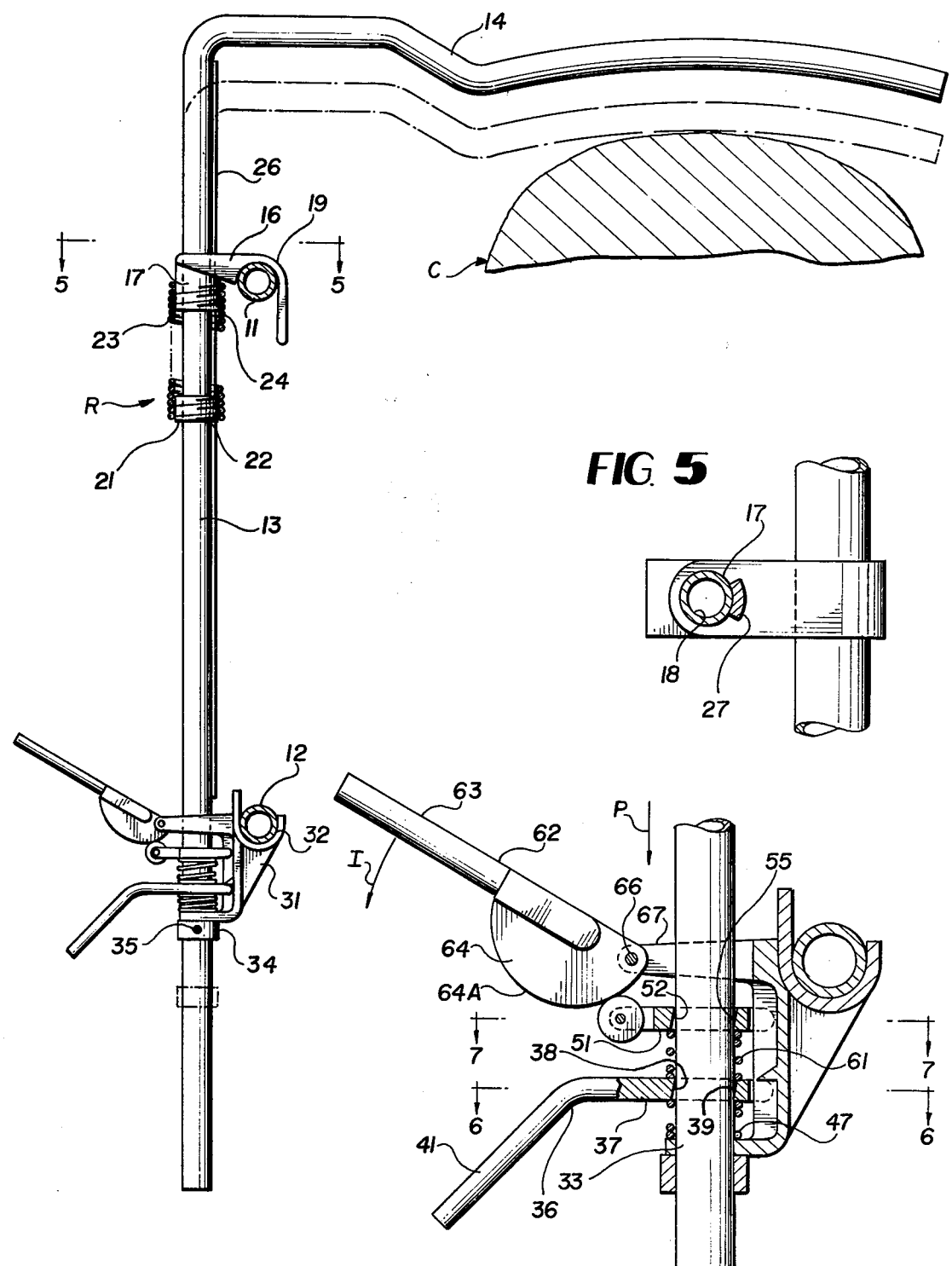

4,183,326

ANIMAL KICK RESTRAINER

BACKGROUND OF THE INVENTION

This invention relates to livestock and more particularly to an apparatus for restraining an animal such as a cow from kicking.

In the handling of livestock, particularly cows, kicking presents a problem to an attendant who is required to handle the animal during various procedures such as milking or the like. Various efforts have been made in the past to restrain such kicking by animals through the use of hobbles or the like which have not obtained the desired degree of success. However, it has been recognized that anatomically a constant pressure exerted on the back of the animal just behind the withers is most effective in restricting the kicking tendencies of the animal. With this in mind, various structures have been proposed by means of which a restraining element is positioned in contact with the cow's back to prevent it from kicking. Such prior art devices have only acheived a limited degree of success since they are complicated and therefore of high cost construction. In general, they are difficult to install and require excessive time and considerable skill to manipulate as well as being of limited effectiveness with respect to resisting the forces which can be exerted by an animal such as a cow against any restraint.

OBJECT OF THE INVENTION

Accordingly, a primary object of the invention is to provide a new and novel apparatus for restraining the kicking tendency of livestock such as a cow.

Another object of the invention is to provide a new and novel kick restraining device for a cow or the like which may be easily installed on a conventional enclosure such as a stall and which may be easily moved into kick restraining engagement with the animal.

Still another object of the invention is to provide a new and novel apparatus for inhibiting kicking by an animal such as a cow which is composed of a minimum of parts, which is of a construction so as to easily resist the forces exerted by the animal during restraint without damage while remaining in the adjusted position and which is capable of repeated use with a minimum of maintenance.

The objects of the invention and other related objects are accomplished by the provision of a vertically extending support rod on which is slidably mounted an upper bracket adapted for overlying engagement with the upper bar of a pair of vertically spaced parallel bars adjacent an animal to be restrained. The support rod is provided with a laterally extending restraining member for overlying engagement with the back of an animal and yieldable means are provided for coupling the support rod to the upper bracket for urging the rod vertically upward into a normally extended position. A lower bracket is also slidably mounted on the support rod in underlying spaced apart relationship with the upper bracket and is adapted for underlying engagement with the lower other pair of bars and releasable means are provided on the lower bracket for yieldingly retaining the support bar in a vertically adjusting position on the lower bracket. Actuating means are provided on the lower bracket moveable between a normally inoperative position and an operative position in binding engagement with the support rod for movement of the support rod vertically downward from the normally extended position against the urging force of the yieldable means into an adjusted vertical position with the restraining member in engagement with the back of the animal and means are provided for releasing the releasable means to permit the support rod to move vertically upward into the normally extended position under the urging force of the yieldable means.

Other objects and advantages will become apparent in the following specification when considered in light of the attached drawings.

BRIEF DESCRIPTION OF THE DRAWINGS

FIG. 1 is a side elevational view of the kick restrainer of the invention in an installed position;

FIG. 2 is an enlarged view partially in section of a portion of the apparatus of FIG. 1;

FIG. 5 is a sectional view taken substantially along lines 5—5 of FIG. 1 in the direction of the arrows;

DESCRIPTION OF THE PREFERRED EMBODIMENT

Figure 3:
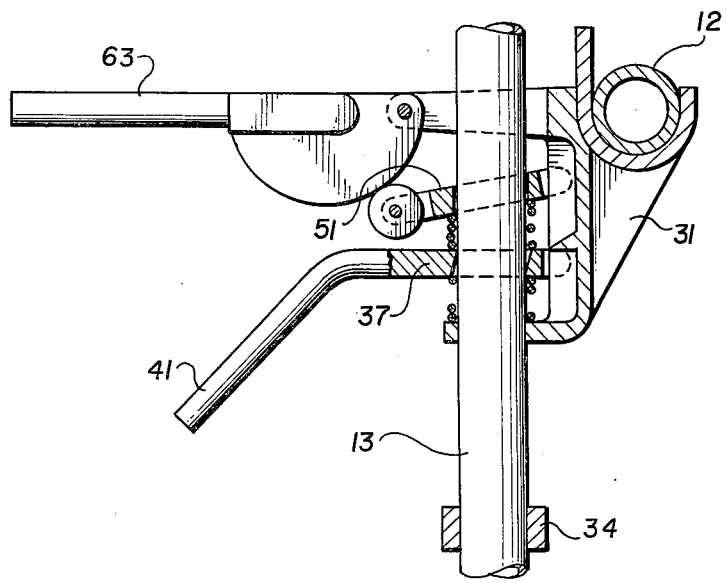
FIG. 3 is a view similar to FIG. 2 with the component parts in another position.

Referring now to FIG. 1, there is shown a kick restrainer constructed in accordance with the invention and designated generally by the letter R. The restrainer R is arranged to be detachably mounted on an upper and lower bar 11, 12 respectively disposed in parallel, vertically spaced apart relationship adjacent an animal such as a cow. The bars 11, 12 may be a part of a retaining wall for an enclosure or the like such as a stall into which a cow is confined, the back portion of which is shown in FIG. 1 and designated generally by the letter C.

The apparatus of the invention includes a vertically extending support rod 13 having a laterally extending restraining member 14 on the upper end, preferably formed integrally therewith for overlying engagement with the back of the cow C as shown in the dotted line position of FIG. 1. An upper bracket 16 is slidably mounted on the support rod 13 and includes a sleeve portion 17 having an inner bore 18 through which the support rod 13 is inserted as shown best in FIG. 5. The upper bracket 16 also includes a trough shaped downwardly opening portion 19 for overlying nested engagement with the upper bar 11.

Yieldable means are provided for coupling the support rod 13 to the upper bracket 16 for urging the rod vertically upward into a normally extended position as indicated by the solid line position of FIG. 1. More specifically, a collar 21 is suitably secured to the support rod 13 by welding or the like and the collar 21 is provided with external threads 22 for threaded engagement with the lower end of a helical spring 23. The upper bracket sleeve 16 includes an externally threaded portion 24 which is threadedly connected to the upper end of the helical spring 23 so that in the relaxed condition of the spring 23 the support rod occupies the normally extended solid line position of FIG. 1. In order to prevent axial rotation of the support rod 13 during vertical movement between the solid line and dotted line positions of FIG. 1, the support rod 13 is provided with a longitudinally extending key 26 which is received within a keyway 27 formed in the sleeve 17 as shown best in FIG. 5.

The kick restrainer of the invention also includes a lower bracket 31 having an upwardly opening trough shaped portion 32 in vertical alignment with the trough shaped portion 19 of the upper bracket 16 for underlying engagement with the lower bar 12 as shown in FIG. 1. The lower bracket 31 is slidably mounted on the support rod 13 and includes an opening 33 for slidably accommodating the support rod 13 as shown in FIG. 2. Adjustable stop means are mounted on the support rod 13 for engagement with the lower bracket 31 to maintain the lower bracket in underlying engagement with the lower bar 12. More specifically, the stop means includes a collar 34 which may be secured to the support rod 13 in a selected position by suitable means such as a set screw 35. Thus, when the upper bracket 16 is hung on the upper bar 11 the lower bracket 31 is moved upwardly into engagement with the lower bar 12 with the collar 34 moved into underlying engagement with the lower bracket 31 and fixed therein to hold the uppr and lower brackets 16, 31 in clamping engagement with the bars 11, 12.

Figure 6:
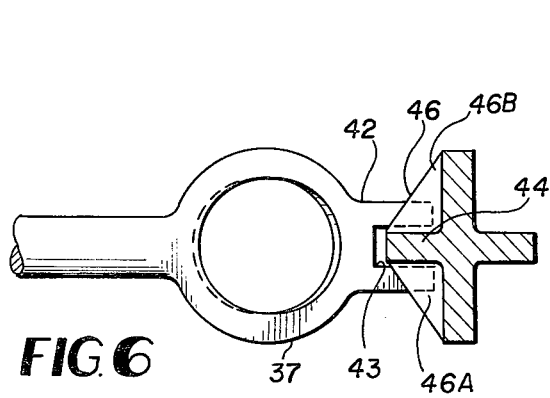
FIG. 6 is a sectional view taken substantially along lines 6—6 of FIG. 2 in the direction of the arrows.

Releasable means are provided on the lower bracket 31 for yieldingly retaining the support rod 13 in a vertically adjusted position. More specifically, the releasable means include a lever member 36 which includes a central portion 37 having an opening 38 defined by a side wall 39 for slidably accommodating the support rod 13 as shown best in FIG. 2. The lever member 36 includes a handle 41 extending outwardly from the lower bracket 31 for manipulation by the operator and an extension 42 on the opposite side of the central portion 37 from the handle 41 as shown best in FIG. 6. In the preferred embodiment, the extension 42 is preferably in the form of a yoke defining a slot 43 for accommodating a vertically extending rib 44 on the lower bracket 31 thereby forming cooperating guide means for confining the vertical movement of the lever member 36 to a vertical path.

The bracket 31 is also provided with a projection 46 which may be in the form of gussets 46A, 46B on opposite sides of the rib 44 for underlying engagement with the extension 42 on the lever member 36.

Spring means such as a coil spring 47 are disposed between the lower bracket 31 and the central portion 37 of the lever member 36 for yieldingly urging the lever member central portion 37 upwardly with the extension 42 in engagement with the projection 46 so that the side wall 39 of the opening 38 is moved into binding engagement with the support rod 13 to retain the support rod 13 in an adjusted vertical position. It will be noted that the side wall 39 is angularly disposed with respect to the axis of the support rod 13 thereby enhancing the binding engagement between the side wall 39 and the peripheral surface of the support rod 13.

Figure 7:
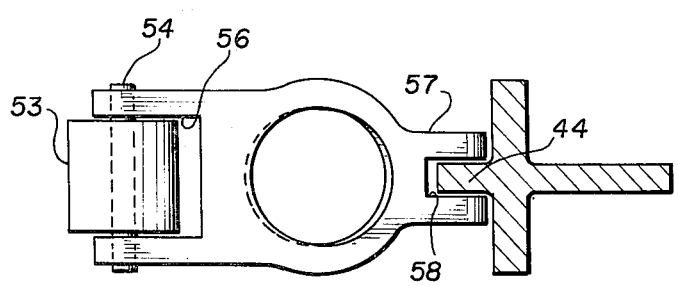
FIG. 7 is a sectional view taken substantially along lines 7—7 of FIG. 2 in the direction of the arrows.

The lower bracket 31 is also provided with actuating means moveable between a normally inoperative position as shown in FIG. 2 and an operative position as shown in FIG. 3 in binding engagement with the support rod 13 for movement of the support rod vertically downward from the normally extended position against the urging force of the helical spring 23 associated with the upper bracket 16. More specifically, the actuating means includes a plate member 51 having a central opening 52 for sidably accommodating the support rod 13 as shown best in FIGS. 2, 7. As shown best in FIG. 7 the plate member 51 is provided with a freely rotatable roller 53 mounted thereon by means of a pin 54 and disposed within a slot 56 formed in the plate member 51 outwardly from the lower bracket 31. The plate member 51 also includes an extension 57 on the opposite side of the plate member 51 from the roller 53 which is preferably in the form of a yoke defining a guide slot 58 for accommodating the guide rib 44 on the lower bracket 31 to confine the movement of the plate member 51 to a vertical path similar to that of the lever member 36. A coil spring 61 is disposed between the lever member 36 and the plate member 51 for yieldingly urging the plate member 51 vertically upward as shown best in FIG. 2. An actuating lever 62 having a handle 63 and a cam 64 is pivotally mounted on the lower bracket 31 by means of a pivot pin 66 mounted in a pair of arms 67 preferably formed integrally with the lower bracket 31 on opposite sides of support rod 13. As the spring 61 urges the plate member 51 vertically upward the roller 53 is maintained in engagement with the cam surface 64A of the cam 64 so that the actuating lever 62 is normally maintained in the elevated position of FIG. 2.

In the operation of the invention, when the restraining device of the invention is mounted on the upper and lower bars 11, 12 the support rod 13 and extension 14 are normally maintained in the solid line position in spaced apart relationship with the back of the cow C under the action of the helical spring 23 with the spring 23 in a relaxed condition. In order to affect engagement between the restraining member 14 and the back of the cow C the handle 63 of the actuating lever 62 is moved downwardly in the direction of the arrow I so that engagement between the cam surface 64A and the roller 53 moves the plate member 51 into a slightly inclined position for binding engagement with the support rod 13. As noted in FIG. 3, the side wall 55 which is angularly disposed with respect to the axis of the support rod 13 to facilitate binding engagement as in the lever member 36 engages the peripheral surface of support rod 13 and the support rod is moved vertically downward in the direction of the arrow P to the extent determined by the downward movement of the actuating lever 62 against the urging force of the helical spring 23 which is then put under tension. It will also be noted that the downward movement of the support rod 13 is permitted through the lever member 37 since the lever member 37 yields against the urging force of the spring 47 but returns to the breaking or binding position when release is affected between the plate member 51 and the support rod 13.

Figure 4:
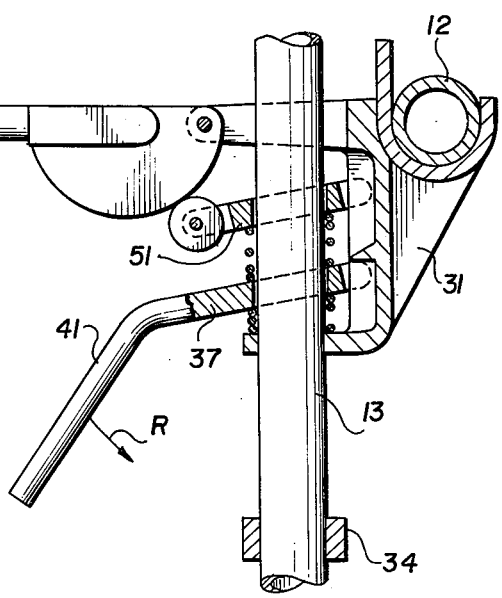
FIG. 4 is a view similar to FIG. 2 showing the component parts in still another position.

The actuating lever 62 may be manipulated one or more times to move the support rod 13 down until engagement is affected between the restraining member 14 and the back of the cow C as shown in the dotted line position of FIG. 1. Subsequently, when it is desired to release the cow C from restraint the actuating lever 36 is moved downwardly in the direction of the arrow R of FIG. 4 by means of the handle 41 disengaging the binding engagement between the central portion 37 and the support rod 13 permitting the support rod to be returned to the normally extended solid line position of FIG. 1 under the urging force of the helical spring 23.

Having thus described the preferred embodiment of the invention it should be understood that numerous structural modifications and adaptations may be resorted to without departing from the spirit of the invention.

What is claimed is:

1. An apparatus for restraining an animal such as a cow from kicking arranged to be detachably mounted on upper and lower bars disposed in parallel, vertically spaced apart relationship adjacent the animal to be restrained comprising, in combination, a vertically extending support rod, an upper bracket adapted for overlying engagement with said upper bar and slidably mounted on said support rod, a laterally extending restraining member on the upper end of said support rod for overlying engagement with the back of an animal to be restrained, yieldable means coupling said support rod to said upper bracket for urging said rod vertically upward into a normally extended position, a lower bracket adapted for underlying engagement with said lower bar slidably mounted on said support rod in underlying, spaced apart relationship with said upper bracket, releasable means on said lower bracket for yieldingly retaining said support rod in a vertically adjusted position on said lower bracket, actuating means on said lower bracket moveable between a normally inoperative position and an operative position in binding engagement with said support rod for movement of said support rod vertically downward from said normally extended position against the urging force of said yieldable means into an adjusted vertical position with said restraining member in restraining engagement with the back of said animal and means for releasing said releasable means to permit said rod to move vertically upward into said normally extended position under the urging force of said yieldable means.

2. An animal restraining apparatus in accordance with claim 1 including adjustable stop means mounted on said support rod for engagement with said lower bracket to maintain said lower bracket in said underlying engagement with said lower bar.

3. An animal restraining apparatus in accordance with claim 2 wherein said stop means comprises a collar slidably mounted on said support rod below said lower bracket and means for securing said collar to said support rod in a vertically adjusted position.

4. An animal restraining apparatus in accordance with claim 1 wherein said yieldable means includes a helical spring, means for connecting one end of said spring to said rod and means for connecting the other end of said spring to said upper bracket and wherein said spring is in a relaxed condition in the normally extended position of said rod.

5. An animal restraining apparatus in accordance with claim 4 wherein said means for connecting one end of said helical spring to said rod includes an externally threaded collar secured to said support rod adjacent said upper bracket, said helical spring having a lower end in threaded engagement with said collar and wherein said means for connecting the other end of said helical spring to said upper bracket includes a sleeve on said upper bracket having an externally threaded portion for slidably mounting said upper bracket on said support rod, the upper end of said helical spring being connected in threaded engagement with said sleeve threaded portion.

6. An animal restraining apparatus in accordance with claim 5 including a longitudinally extending T on the upper portion of said support rod, a keyway in said sleeve for slidably accommodating said key during the vertical movement of said support rod between said extended position and said adjusted vertical position.

7. An animal restraining apparatus in accordance with claim 1 wherein said upper bracket includes a downwardly opening trough-shaped portion for clamping engagement with said upper bar and wherein said lower bracket includes an upwardly opening trough-shaped portion for clamping engagement with said lower bar.

8. An animal restraining apparatus in accordance with claim 1 wherein said releasable means comprises a lever member including a central portion having an opening defined by a side wall for slidably accommodating said support rod, a handle extending outwardly from said lower bracket and an extension on said central portion opposite said handle, a projection on said lower bracket, spring means disposed between said lower bracket and said lever central portion for yieldingly urging said lever member upwardly with said extension in underlying engagement with said projection to yieldingly retain said lever member in binding engagement between said opening side wall and said support rod.

9. An animal restraining apparatus in accordance with claim 8 wherein said actuating means includes a plate member having an opening defined by a side wall for slidably accommodating said support rod, a roller rotatably mounted on said plate member outwardly from said lower bracket, an actuating lever pivotally mounted on said lower bracket, a cam mounted on said actuating lever, cooperating guide means on said lower bracket and said plate member for confining the movement of said plate member to a vertical path, spring means disposed between said plate member and said lever member for urging said plate member upwardly to maintain said roller in engagement with said cam whereby pivotal downward movement of said actuating lever with rolling engagement between said cam and said roller moves said plate member into a position for binding engagement between said opening side wall and said support rod for downward movement of said support rod with respect to said lower bracket.

10. An animal restraining apparatus in accordance with claim 9 wherein said side walls defining said openings on said lever member and said plate member are angularly disposed for positive binding engagement between said side walls and said support rod.

* * * * *